(12) United States Patent
Takeshita

(10) Patent No.: US 8,179,637 B2
(45) Date of Patent: May 15, 2012

(54) MAGNETIC STORAGE APPARATUS HAVING HEATED RECORDING HEAD

(75) Inventor: Hiroto Takeshita, Kawasaki (JP)

(73) Assignee: Toshiba Storage Device Corporation, Tokyo (JP)

(*) Notice: Subject to any disclaimer, the term of this patent is extended or adjusted under 35 U.S.C. 154(b) by 451 days.

(21) Appl. No.: 12/481,949

(22) Filed: Jun. 10, 2009

(65) Prior Publication Data

US 2010/0053811 A1 Mar. 4, 2010

(30) Foreign Application Priority Data

Aug. 28, 2008 (JP) ................................. 2008-219870

(51) Int. Cl.
*G11B 5/02* (2006.01)
(52) U.S. Cl. .................................. 360/125.74; 360/135
(58) Field of Classification Search ............ 360/125.74, 360/125.31, 135, 59, 62
See application file for complete search history.

(56) References Cited

U.S. PATENT DOCUMENTS

| | | | |
|---|---|---|---|
| 7,195,827 B2* | 3/2007 | Maeda et al. ................... | 428/831 |
| 7,446,969 B2* | 11/2008 | Akagi et al. ..................... | 360/59 |
| 2001/0051287 A1* | 12/2001 | Kikitsu et al. ......... | 428/694 ML |
| 2002/0192506 A1* | 12/2002 | Coffey et al. ......... | 428/694 TM |
| 2003/0108721 A1* | 6/2003 | Fullerton et al. .............. | 428/195 |
| 2003/0184922 A1* | 10/2003 | Taguchi ..................... | 360/324.1 |
| 2004/0057157 A1* | 3/2004 | Shimizu et al. ............... | 360/135 |
| 2005/0141137 A1 | 6/2005 | Okada et al. | |
| 2006/0143635 A1* | 6/2006 | Liu et al. ......................... | 720/659 |
| 2006/0222904 A1* | 10/2006 | Hsia et al. ...................... | 428/832 |
| 2007/0048552 A1* | 3/2007 | Soeya ............................ | 428/828 |
| 2007/0065955 A1* | 3/2007 | Maeda et al. ..................... | 438/3 |
| 2008/0182131 A1* | 7/2008 | Iwasaki ......................... | 428/800 |
| 2009/0040644 A1* | 2/2009 | Lu et al. ........................... | 360/59 |
| 2009/0148649 A1* | 6/2009 | Shi et al. ..................... | 428/64.4 |
| 2009/0231746 A1* | 9/2009 | Kaizu et al. ..................... | 360/59 |
| 2009/0258186 A1* | 10/2009 | Fontana et al. ............... | 428/131 |
| 2010/0165509 A1* | 7/2010 | Uwazumi et al. .............. | 360/135 |

FOREIGN PATENT DOCUMENTS

| | | |
|---|---|---|
| JP | 1-319146 | 12/1989 |
| JP | 4-95201 | 3/1992 |
| JP | A 2000-251202 | 9/2000 |
| JP | 2001-76331 | 3/2001 |
| JP | A 2001-101642 | 4/2001 |
| JP | A 2005-190518 | 7/2005 |

OTHER PUBLICATIONS

Office action issued by the Japanese Patent Office in corresponding application No. 2008-219870, mailed Nov. 1, 2011.

* cited by examiner

*Primary Examiner* — Brian Miller
(74) *Attorney, Agent, or Firm* — Greer, Burns & Crain, Ltd.

(57) ABSTRACT

A magnetic storage apparatus includes a magnetic storage medium including a recording layer, and a backing layer including a portion having a Curie temperature lower than that of the recording layer, a recording head that generates a magnetic field for recording from a side of the recording layer opposite to another side on which the backing layer is provided, and a heater unit heating at least a part of an area in proximity to a target area for recording by the recording head.

6 Claims, 15 Drawing Sheets

Fig. 8

| | OVERWIRTE CHARACTERISTIC | ADJACENT AREA ERASURE CHARACTERISTIC (OUTPUT ATTENUATING RATIO) |
|---|---|---|
| EMBODIMENT | -41dB | 2.1% |
| COMPARATIVE EXAMPLE | -40dB | 23.5% |

MAGNETIC STORAGE APPARATUS HAVING HEATED RECORDING HEAD

CROSS-REFERENCE TO RELATED APPLICATION

This application is based upon and claims the benefit of priority of the prior Japanese Patent Application No. 2008-219870, filed on Aug. 28, 2008, the entire contents of which are incorporated herein by reference.

FIELD

A certain aspect of the embodiments discussed herein is related to a magnetic storage apparatus and a magnetic storage medium.

BACKGROUND

Recently, an information storage apparatus such as hard disk drives (HDD) has been required to have a rapidly increased storage capacity, and there has been an increasing demand for improvements in the recording density. There is rising concern that the increased recording density may frequently cause a problem that information that has been recorded in a track adjacent to a track in which information is being recorded by a recording head may be erased. This problem is called adjacent track erasure (ATE) or side erasure.

There is a proposal to arrange magnetic shields on both sides of the magnetic pole of the recording head to absorb the magnetic fluxes towards the adjacent tracks and to thus restrain the adjacent track erasure (see Japanese Laid-Open Patent Publication No. 2005-190518: hereinafter Document 1).

There is another proposal to project laser light having a diameter less than the width of the magnetic pole of the magnetic head onto a target track for recording and to thus heat the target track. The heated target track for recording has reduced coercive force and causes the effective width of the target track to be less than the actual width (see Japanese Laid-Open Patent Publication No. 2000-251202: hereinafter Document 2).

It is desired that the intensity distribution of the magnetic field generated by the recording head rapidly rises at the boundary of an area in which information should be recorded in order to restrain the adjacent track erasure or the side erasure.

The magnetic shields as proposed in Document 1 are capable of suppressing the magnetic field from leaking to the adjacent tracks, but may reduce the intensity of the magnetic field that contributes recording on the target track for recording.

Heating the target track for recording as proposed in Document 2 requires laser light to be accurately applied to the target area within the target track for recording. However, it is difficult to align the laser light precisely. Generally, the temperature required to reduce the coercive force of the magnetic layer is 400° C. to 500° C. In practice, it is difficult to instantaneously heat up the hard disk that is rotating at a high velocity so as to reach the above-described temperature. Further, heating may affect other layers in proximity of the recording layer, such as a lubrication layer and a protection layer. More particularly, in the magnetic disk of vertical magnetic recording type, a backing layer of a soft magnetic layer is generally provided to the backside of the recording layer for the purpose of collecting the magnetic fluxes. When the recording layer is heated, the soft magnetic layer is also heated due to thermal conduction, and some problems are concerned. For example, there is a possibility that the capability of collecting the magnetic fluxes of the soft magnetic layer may be lost. When the capability of collecting the magnetic fluxes is lost, information may not be recorded on the recording layer.

SUMMARY

According to an aspect of the present invention, there is provided a magnetic storage apparatus including: a magnetic storage medium including a recording layer, and a backing layer including a portion having a Curie temperature lower than that of the recording layer; a recording head that generates a magnetic field for recording from a side of the recording layer opposite to another side on which the backing layer is provided; and a heater unit heating at least a part of an area in proximity to a target area for recording by the recording head.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 8 illustrates measurement results of overwrite characteristics and adjacent area erasure characteristics of the structures illustrated in FIGS. 6 and 7;

DESCRIPTION OF EMBODIMENTS

First Embodiment

A description will now be given, with reference to FIGS. 1 through 8, of a magnetic storage apparatus and a magnetic storage medium in accordance with a first embodiment.

Figure 1:
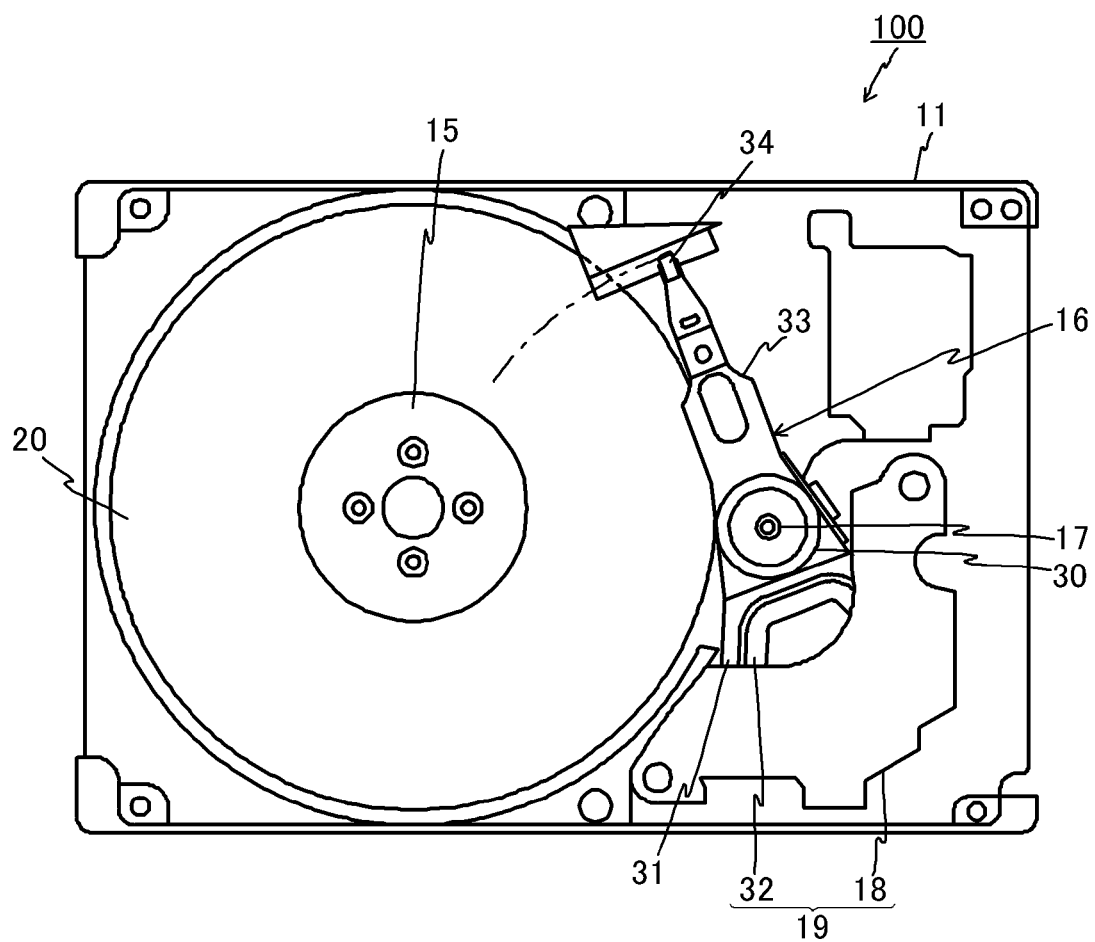
FIG. 1 is a plan view of a hard disk drive in accordance with a first embodiment.

FIG. 1 illustrates an internal structure of a hard disk drive (HDD), which is an exemplary device 100 of the magnetic storage apparatus in accordance with the first embodiment. As illustrated in FIG. 1, the HDD 100 is equipped with a box-like enclosure 11, a magnetic disk 20, a spindle motor 15, a head stack assembly 16, and a control board. The magnetic disk 20 is a magnetic storage medium and is housed in a space in the enclosure 11. The control board has a head drive circuit and LSI chips for various controls. The enclosure 11 may be composed of a base and an upper lid or top cover. The upper lid is not illustrated in FIG. 1.

The magnetic disk 20 has a recording plane on the front surface, and is driven to rotate at velocities, which may, for example, be as high as 4200-15000 rpm. The magnetic disk 20 may have another recording plane on the back surface. A plurality of magnetic disks may be provided so as to be simultaneously driven by the spindle motor 15.

The head stack assembly 16 has a housing 30 of a hollow cylindrical shape, a fork 31, a coil 32, a carriage arm 33, and a head slider 34. The fork 31 is fixed to the housing 30. The coil 32 is held by the fork 31. The carriage arm 33 is fixed to the housing 30. The head slider 34 is held by the carriage arm 33. Two sets of carriage arm and head slider are symmetrically arranged vertically across the magnetic disk having the recording planes on the front and back sides thereof. When the hard disk drive has multiple recording disks, the set of carriage arm and head slider is provided for each recording plane of each magnetic disk.

Figure 4A:
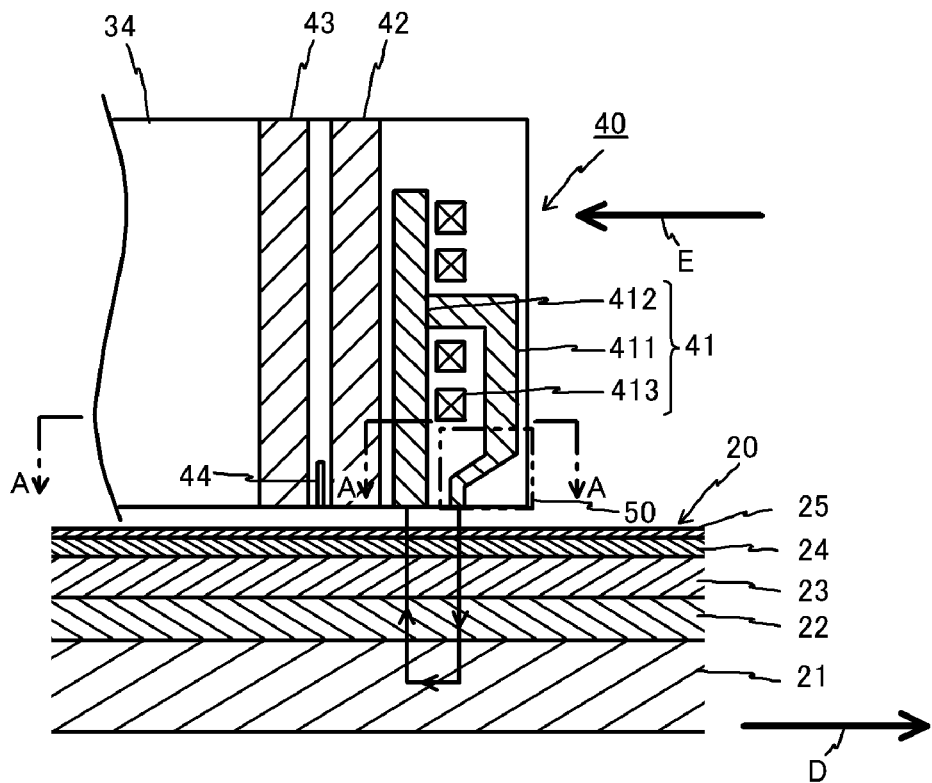
FIG. 4A is a cross-sectional view of a magnetic head and a magnetic disk.
Figure 4B:
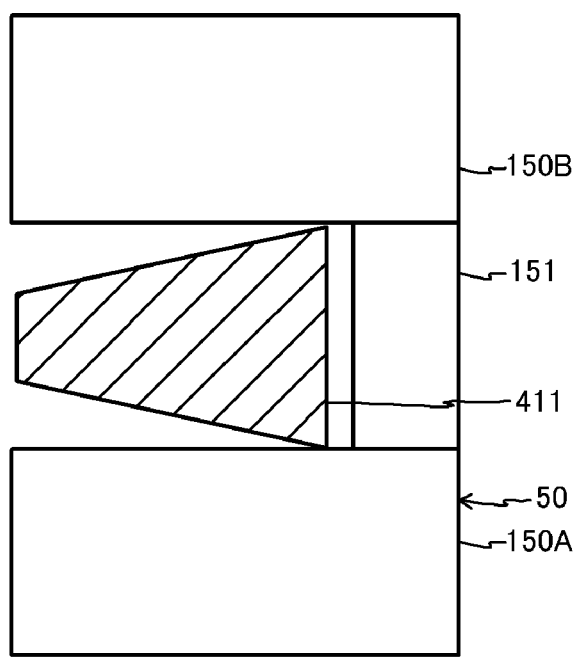
FIG. 4B schematically illustrates a main magnetic pole and a light projection head.

The carriage arm 33 may be formed by cutting a stainless plate or pressing an aluminum member. A magnetic head 40 is provided to a tip end of the head slider 34, as illustrated in FIG. 4A.

The head stack assembly 16 is rotatably joined to the enclosure 11 by a bearing member 17 provided at the center of the housing 30. A voice coil motor 19 causes the carriage arm 33 to swing about the bearing member 17. The voice coil motor 19 is composed of the coil 32 and a magnetic pole unit 18 including a permanent magnet fixed to the enclosure 11. The swing movement of the carriage arm 33 is illustrated by a one-dot chained line.

In the HDD 100, information or data is recorded on and reproduced from the magnetic disk 20 by the magnetic head 40 attached to the tip end of the carriage arm 33. The head slider 34 that holds the magnetic head 40 flies over the surface of the magnetic disk 20 due to buoyant force caused by the rotation of the magnetic disk 20. The magnetic head 40 records and reproduces information on and from the magnetic disk 20 in a state in which a slight gap is maintained between the magnetic head 40 and the magnetic disk 20. The head carriage arm 33 is caused to swing about the bearing member 17 so that the magnetic head 40 can be moved across the tracks to seek a target track for recording or reproduction.

Figure 2:
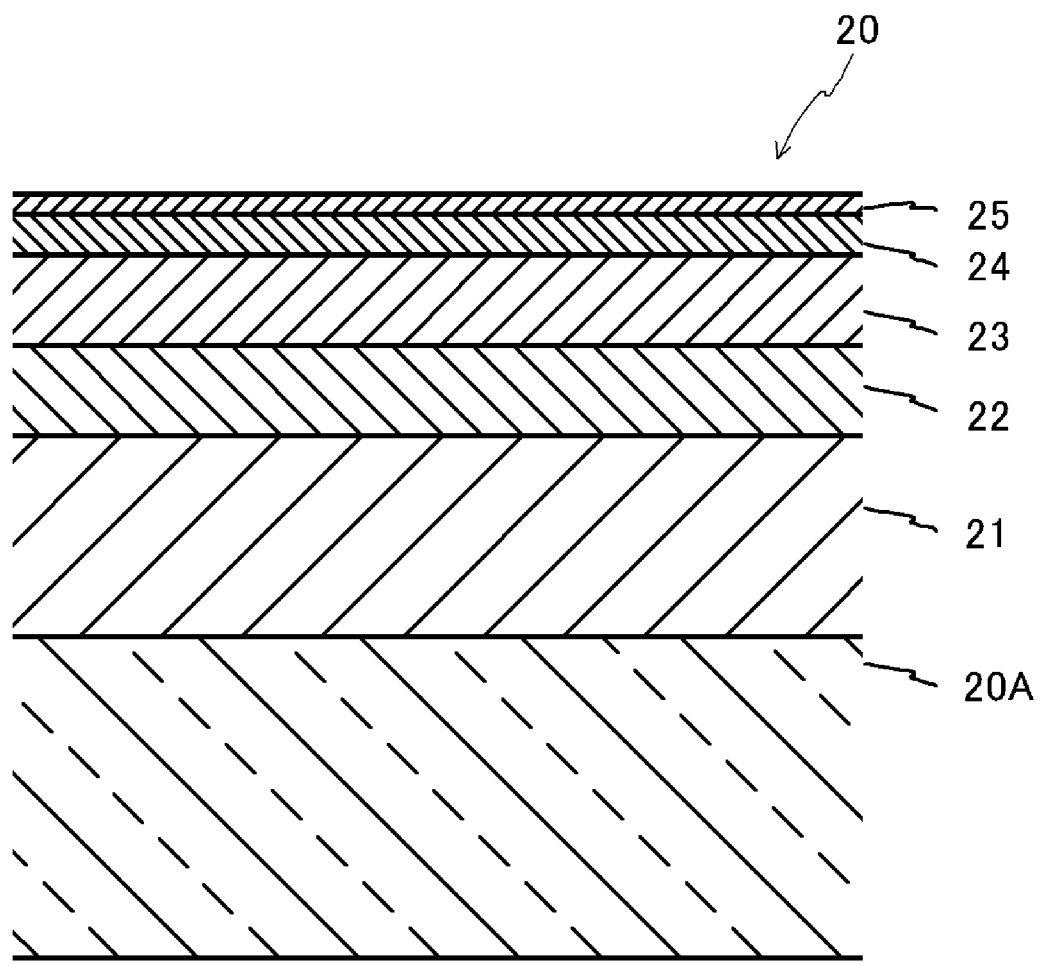
FIG. 2 is a cross-sectional view of a magnetic disk.

FIG. 2 is a cross-sectional view of a multilayered structure of the magnetic disk 20. The magnetic disk 20 has a base plate 20A made of glass on which multiple layers are stacked. More specifically, stacked are a soft magnetic layer (backing layer) 21, a non-magnetic intermediate layer 22, a hard magnetic layer (recording layer) 23, a protection layer 24, and a lubrication layer 25 in this order on the base plate 20A.

For example, the soft magnetic layer 21 may be about 100 nm and made of a Ni-base soft magnetic material containing Al. The composition ratio of Ni and Al is such that Ni is 90 atm %, and Al is 10 atm %. The N-base soft magnetic material has a Curie temperature as low as about 150° C. and a high temperature coefficient of saturation magnetization, as illustrated in a graph of FIG. 3.

Besides the N-base soft magnetic material, the present embodiment may employ another material having low Curie temperatures, such as Ni90Ti10, Ni95Cr5, Ni95Mo5 or (Ni90Al10)99Si1. The suffix numerals denote atomic percentage (atm %). The composition ratios of these materials may not be limited to the above, but may be adjusted at the desired Curie temperatures. The Ni-base soft magnetic material contains at least one of Al, Ti, Cr, Mo and Si.

For example, the intermediate layer 22 may be about 15 nm thick and made of Ru.

Figure 3:
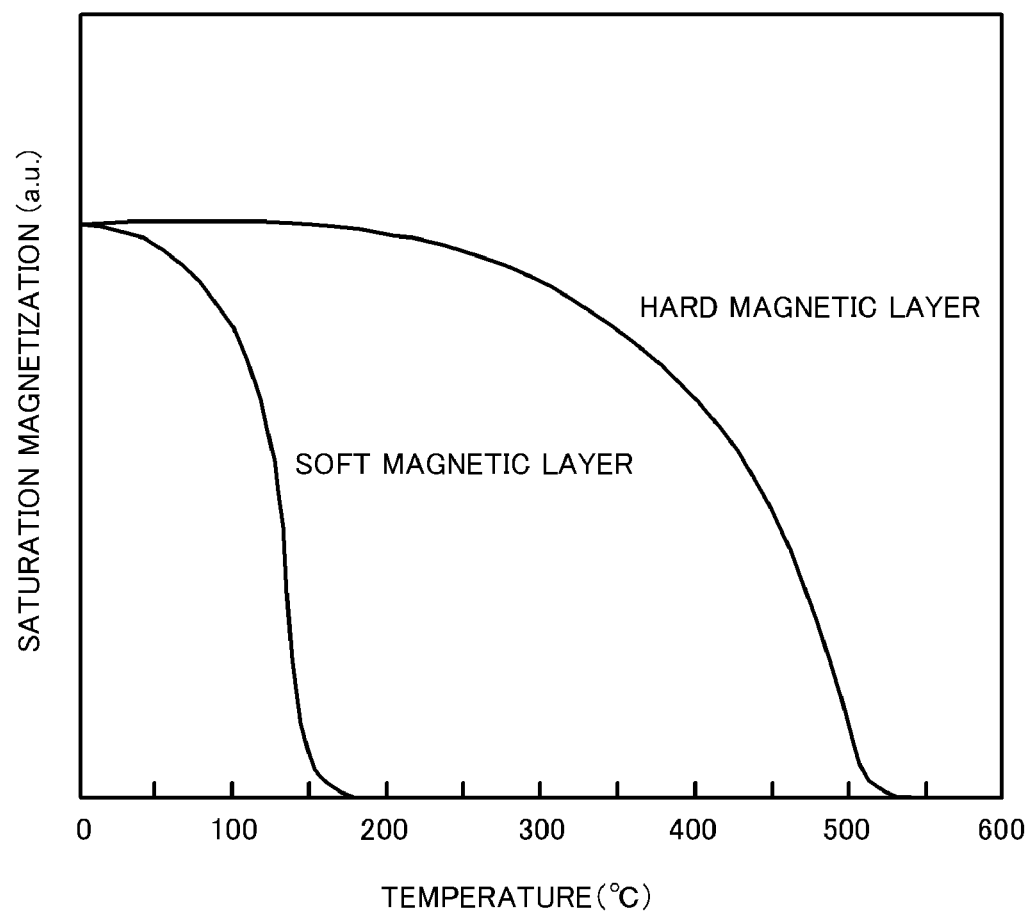
FIG. 3 is a graph illustrating saturation magnetization v temperature characteristics of soft and hard magnetic layers.

For example, the hard magnetic layer 23 may be about 12 nm thick and made of (Co67Cr13Pt2O)92-(TiO2)8. This hard magnetic layer 23 has a Curie temperature of about 500° C., as illustrated in FIG. 3, which is very higher than that of the soft magnetic layer 21. Data is recorded on the hard magnetic layer 23 by the magnetic field for recording generated by the magnetic head 40 in the vertical magnetic recording.

For example, the protection layer 24 may be about 3 nm thick and made of diamond-like carbon (DLC). The protection layer may, for example, be about 1 nm thick and made of perfluoropolyether.

FIG. 4A schematically illustrates the magnetic head 40. In the first embodiment, the magnetic head 40 is of vertical magnetic recording type. Due to rotation of the magnetic disk 20 as depicted in a direction of arrow D in FIG. 4A, the magnetic head 40 is moved in a direction of arrow E opposite to that of arrow D along the longitudinal direction of the tracks of the magnetic disk 20.

As illustrated in FIG. 4A, the magnetic head 40 is composed of a recording head 41, an upper magnetic shield 42, a lower magnetic shield 43, and a reproduction sensor head (MR element) 44 arranged between the magnetic shields 42 and 43. According to the first embodiment, the magnetic head 40 is provided with a light projection head 50, which is an exemplary heater unit. As illustrated in a cross-sectional view of FIG. 4B taken along a line A-A depicted in FIG. 4A, the light projection head 50 is provided so as to enclose three sides of the recording head 41, more particularly, a main magnetic pole 411 of the recording head 41. The light projection head 50 has a pair of laser diodes 150A and 150B, and a joint member 151 that joins the laser diodes 150A and 150B.

As illustrated in FIG. 4A, the recording head 51 has a main magnetic pole 411, a sub magnetic pole 412, and a coil 413 for information recording. When current flows in the coil 413, the magnetic flux from the main pole 411 passes through the hard magnetic layer 23 straightforwardly and reaches the soft magnetic layer 21. Then, the magnetic flux returns to the main pole 411 through the soft magnetic layer 21 and the sub magnetic pole 412.

A description will now be given of a method for recording information on a target track by using the recording head 41 and the light projection head 50 configured as described above.

Figure 5:
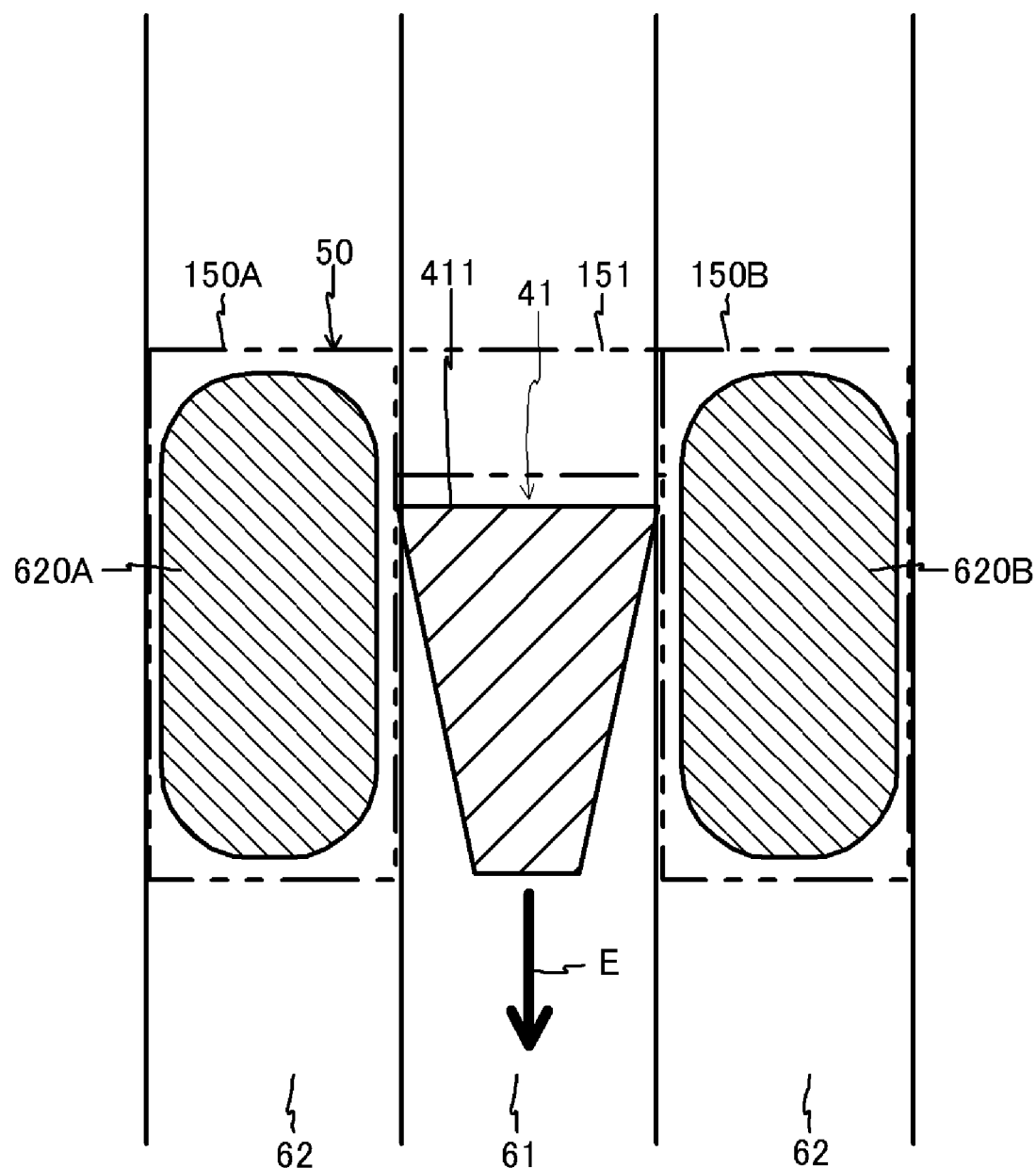
FIG. 5 is a plan view of the main magnetic pole of a recording head and tracks on a magnetic disk.
Figure 6:
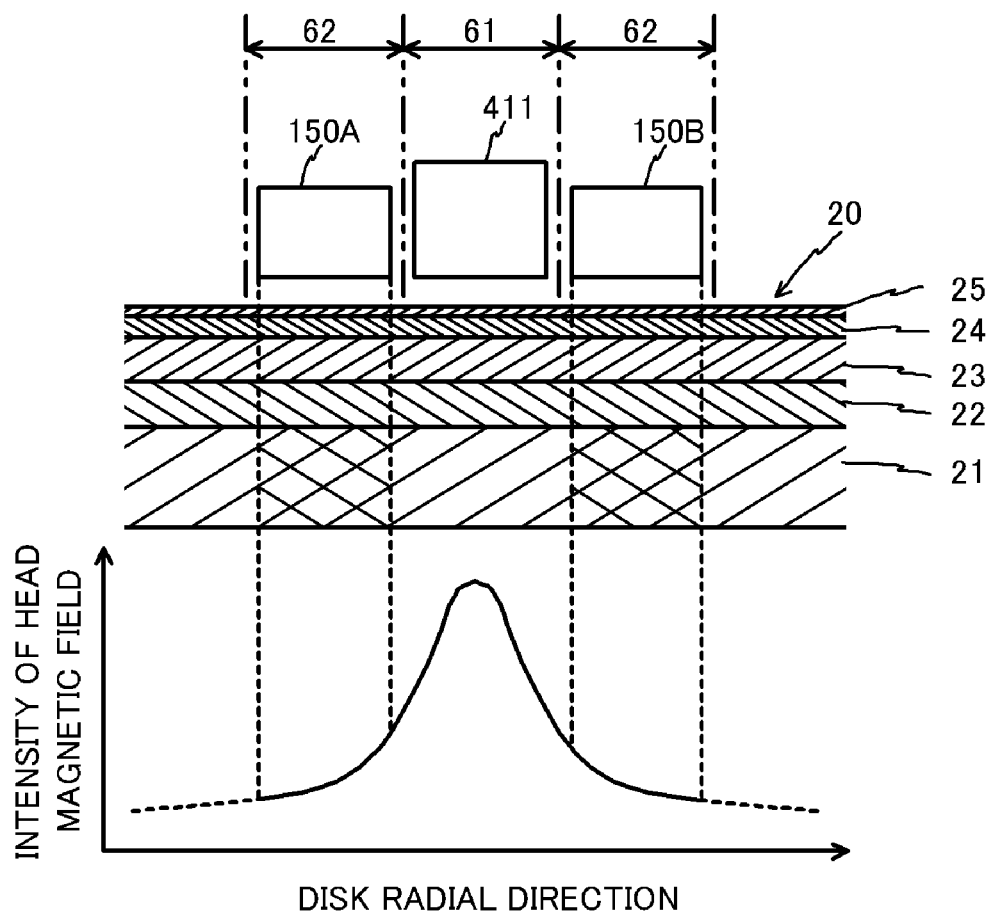
FIG. 6 illustrates an intensity distribution of a head magnetic field in the radial direction of a magnetic disk.

FIG. 5 illustrates a situation in which information is being recorded on a target track 61 on the magnetic disk 20 by the recording head 41, more specifically, the main magnetic pole 411. FIG. 6 illustrates a cross-sectional view of the magnetic disk 20 and the intensity distribution of the head magnetic field.

As illustrated in FIG. 5, while information is being recorded on the target track 61 by the recording head 41 (in other words, while the magnetic flux to the magnetic disk 20 is being generated by the main magnetic pole 411), spot lights 620A and 620B from the laser diodes 150A and 150B are projected onto the tracks adjacent to the target track 61. The portions to which the spot lights 620A and 620B are applied are rapidly heated up. Thus, the temperatures of parts of the soft magnetic layer 21 with cross hatching become equal to, for example, 150° C. or higher. The raised temperatures of parts of the soft magnetic layer 21 should be lower than the Curie temperature of the hard magnetic layer 23.

Figure 7:
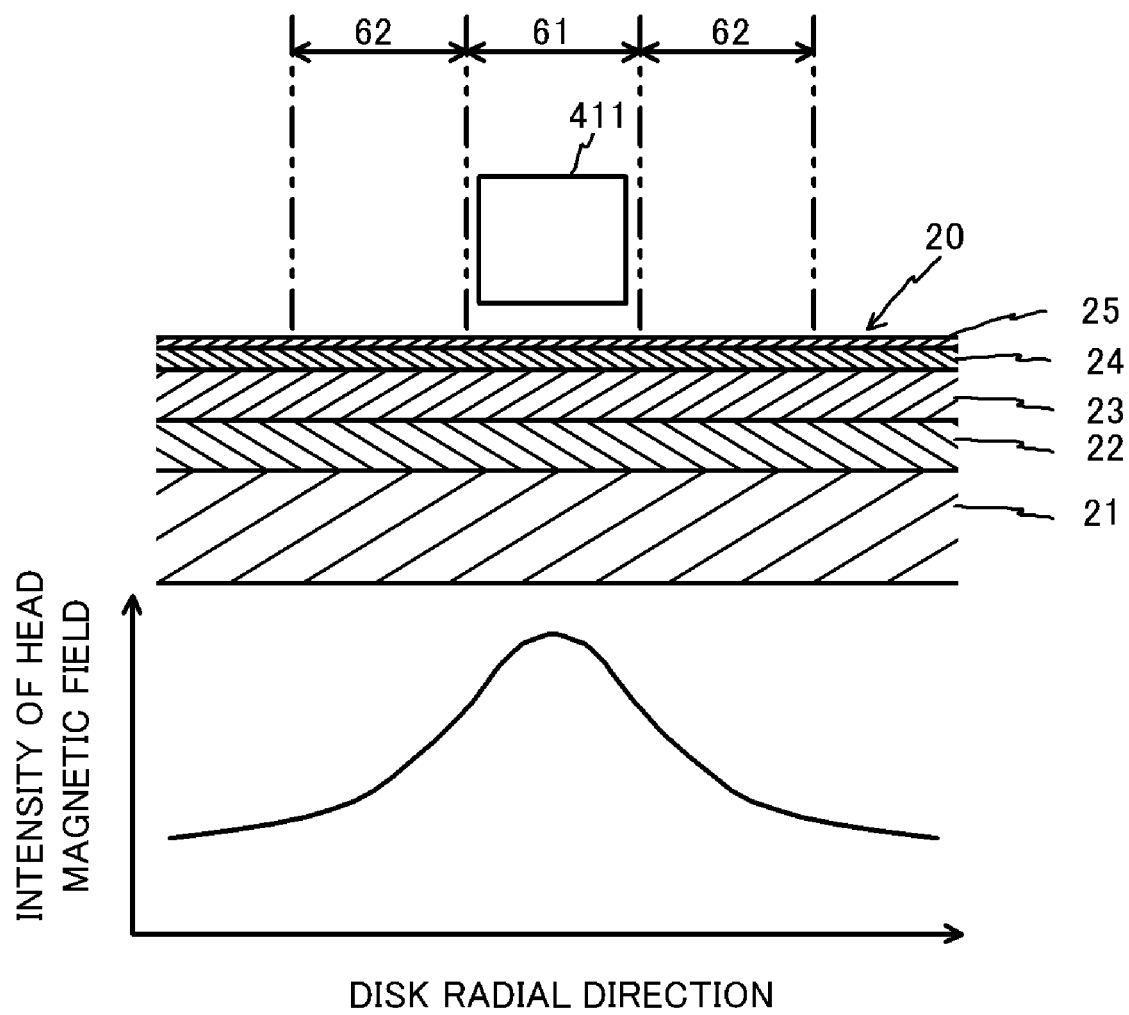
FIG. 7 illustrates an intensity distribution of a head magnetic filed of non-heating type for use in comparison with the structure illustrated in FIG. 6.

When the temperatures of parts of the soft magnetic layer 21 become equal to or higher than 150° C., the temperatures go beyond the Curie temperature and the capability of absorbing the magnetic flux is almost lost. In contrast, the other portions of the soft magnetic layer 21 of the target track 61 for recording that are not heated are kept in high saturation magnetization and are capable of absorbing the magnetic flux from the recording head 41. The capability of absorbing the magnetic flux of the soft magnetic layer 21 is controlled on the heat application/non-application base. FIG. 7 illustrates a comparative example whose adjacent tracks are not heated. It can be seen from FIGS. 6 and 7 that the heat magnetic field in FIG. 6 is far steeper than that in FIG. 7 and the magnetic flux from the recording head 41 concentrates on the target track 61 for recording in FIG. 6.

The soft magnetic layer 21 employed in the present embodiment is made of a material having a large temperature coefficient of saturation magnetization in which the saturation magnetization greatly changes in response to temperature change. Thus, even when the temperature distribution in the soft magnetic layer 21 is gentle due to thermal conduction obtained by heating the adjacent tracks 62, the distribution of the head magnetic field has a steep change. It is thus possible to prevent the capability of absorbing the magnetic flux of the soft magnetic layer in the adjacent tracks 62, while maintaining the capability of absorbing the magnetic flux of the soft magnetic layer in the target track 61 for recording.

In the first embodiment, there is a great difference (about 350° C.) between the Curie temperature of the soft magnetic layer 21 (about 150° C.) and the Curie temperature of the hard magnetic layer 23 (about 500° C.). Thus, even when the adjacent tracks 62 are heated up to 150° C. or higher, the hard magnetic layer 23 is maintained in high saturation magnetization. Therefore, there is a very small possibility that information on the adjacent tracks 62 may happen to be lost.

A description will now be given of measurement results of an overwrite characteristic and an adjacent area erasure characteristic. The overwrite characteristic indicates a capability of writing of the magnetic head. The adjacent area erasure characteristic indicates an output attenuating ratio. The measurement used an instrument of spin stand and used the comparative example of non-heating type illustrated in FIG. 7 for comparison with the present embodiment. In the measurement, the magnetic disk used for the present embodiment and the comparative example had a coercive force of about 5 kOe and the skew angle of the magnetic head (the tilt of the main magnetic pole 411 with respect to the track) was set at 15°.

The current that flows through the magnetic head in the spin stand was set to 40 mA, and the width of the write magnetic pole of the recording head (the size in the track width direction) was 100 nm. The magnetic disk was rotated at a velocity of 15 m/s.

In the measurement of the overwrite characteristic, a first bit pattern was recorded on the magnetic disk at a high recording density of 400 kFCI (flux change per inch). Subsequently, a second bit pattern was overwritten onto the first bit pattern at a low recording density of 95 kFCI. Then, a change of signal output of the first bit patterns was measured. FIG. 8 illustrates measurement results. Both the present embodiment and the comparative example had overwrite characteristics equal to or lower than −40 dB, and had almost the same overwrite characteristics.

The adjacent area erasure characteristic was measured in the following sequence.

1) The track pitch was set at 120 nm, and a bit pattern was recorded on the adjacent tracks at 100 kFCI. Then, the output values of the adjacent tracks were measured.

2) Another bit pattern of 800 kFCI was repeatedly written on the target track 10000 times.

3) The output values of the adjacent tracks were measured again, and the attenuation ratios were measured from the initial output values measured at step 1).

It is now assumed that the number of times that another bit pattern is repeatedly overwritten at step 2) (10000 times) is a warranted number of times of recording required in HDD. The output attenuation ratio obtained at step 3) means that the adjacent track erasure is improved as the output attenuation ratio decreases. The greater one of the output attenuation ratios related to the two adjacent tracks was employed.

FIG. 8 indicates the measurement results of the adjacent area erasure characteristics (output attenuation ratios). The present embodiment has a very small output attenuation ratio of 2.1% in adjacent track erasure. It can be said that the above ratio is within the range of error. In contrast, the comparative example has a very large output attenuation ratio of 23.5%, which indicates that adjacent track erasure has occurred. It can be seen from the measurement results of the overwrite characteristic and the adjacent area erasure characteristic that the present embodiment is capable of suppressing widening of the magnetic field distribution of the magnetic head and realizing high-density recording.

As described above, according to the first embodiment, the soft magnetic layer 21 of the magnetic disk 20 has a Curie temperature lower than that of the hard magnetic layer 23. The tracks 62 adjacent to the target track 61 for recording are heated by the light projection head 50 to set the heated portions of the soft magnetic layer 21 at a temperature equal to or higher than the Curie temperature. It is thus possible to lose the capability of absorbing the magnetic flux of the heated portion of the soft magnetic layer 21. This makes it difficult for the magnetic flux to pass through the soft magnetic layer 21 in the heated portions thereof. It is thus possible to suppress information from being recorded on the heated portions (more specifically, on the hard magnetic layer) and to suppress the occurrence of the adjacent track erasure or side erasure at the time of recording information on the target track. It is further possible to obtain a steeper magnetic field distribution by collecting the magnetic flux on the target track 61 for recording and to realize higher density recording on the magnetic disk.

The present embodiment does not need to apply the spot light to the narrow area within the target track for recording but needs only non-application of heat to the target track 61 for recording. Thus, as compared to the comparative example, the spot light can easily be adjusted, and high density recording can be realized with the simple structure. Further, the magnetic disk 20 may be heated at a lower temperature than the comparative example. This factor is advantageous to high density recording in addition to the above-described factors.

It is to be noted that no problem arises from a situation in which the hard magnetic layer 23 is heated when the soft magnetic layer 21 is heated. This is because there is a difference of about 350° C. in Curie temperature between the soft magnetic layer 21 and the hard magnetic layer 23. It is thus possible to suppress the adjacent track erasure or side erasure.

In the present embodiment, the soft magnetic layer 21 is made of quite a unique material. The degree of freedom of choosing the material for the soft magnetic layer 21 is greater than that of choosing the material for the recording layer 23 because the soft magnetic layer 21 is protected by the hard magnetic layer 23 and may be made of a material that is easily oxidized.

The present embodiment employs the light projection head 50 that heats the two tracks adjacent to the recording target track 61. Alternatively, only one of the adjacent tracks may be heated.

The main magnetic pole 411 has a trapezoidal shape that prevents the main magnetic pole 411 from moving beyond the target track and sticking out to the adjacent tracks when the skew angle between the track and the main magnetic pole 411 is changed taking the head orbit and the shape of the track into consideration. However, the main magnetic pole 411 is not limited to the trapezoidal shape but may have another shape such as a rectangular shape.

In FIG. 5, the leading end of the main magnetic pole 411 in the traveling direction (the direction of arrow E) approximately coincides with the leading ends of the spot lights 620A and 620B in the traveling direction. The leading end of the main magnetic pole 411 in the traveling direction is the lower end in FIG. 5, and the leading ends of the spot lights 620A and 620B are lower ends in FIG. 5. The present embodiment is not limited to the above arrangement of the leading ends. For example, the leading ends of the spot lights 620A and 620B may be positioned so as to lead to the leading end of the main magnetic pole 411 in the traveling direction. This arrangement makes it possible to more certainly heat the adjacent tracks.

Second Embodiment

Figure 9:
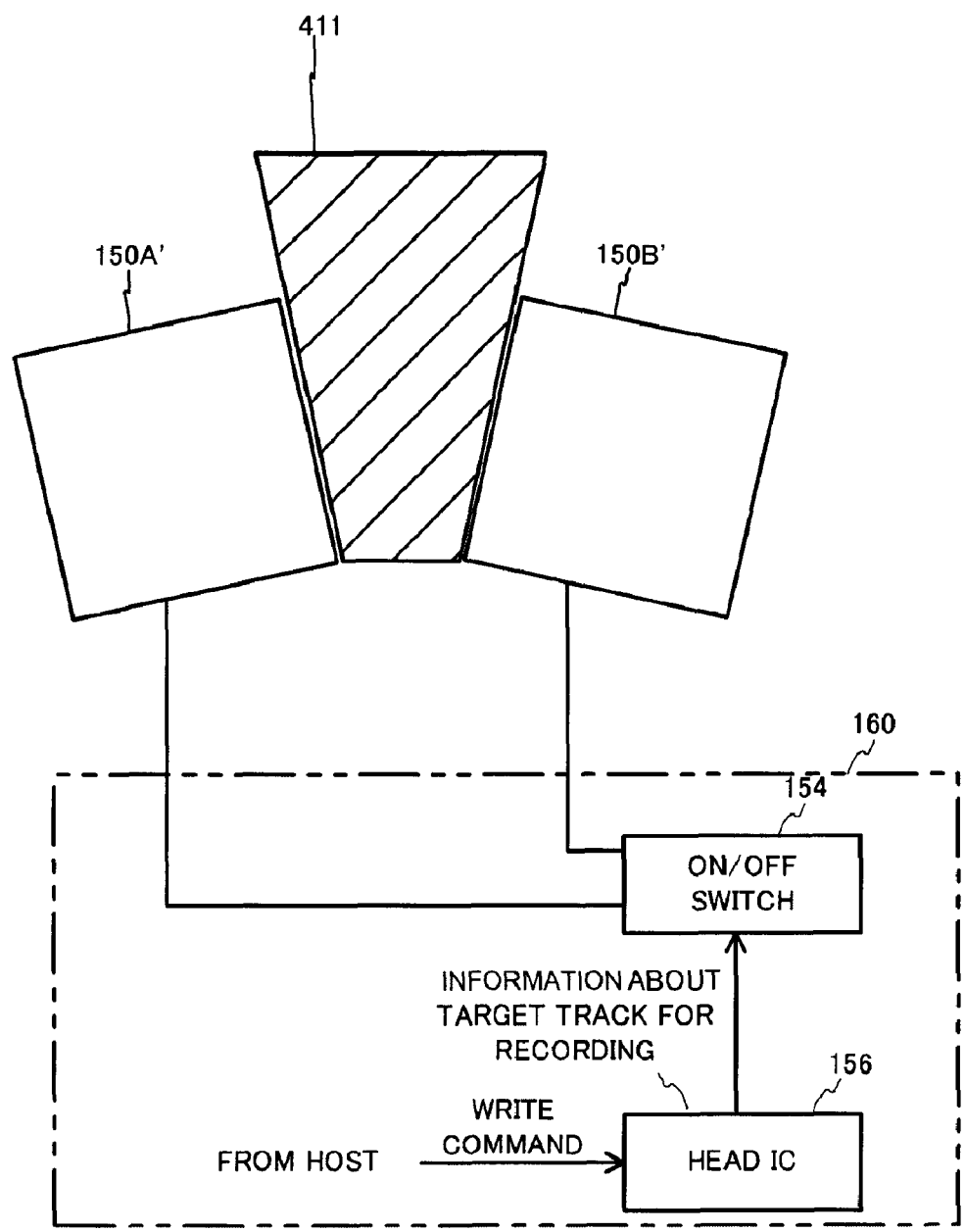
FIG. 9 illustrates a main magnetic pole, a light projection head and an on/off control unit in accordance with a second embodiment.

FIG. 9 schematically illustrates a second embodiment, which is composed of the main magnetic pole 411 and laser diodes 150A' and 150B' in proximity to the main magnetic pole 411. The second embodiment differs from the first embodiment in that an on/off control unit 160 turns on and off the laser diodes 150A' and 150B'.

The on/off control unit 160 has an on/off switch unit 154 and a head IC 156, which may be provided in the hard disk drive. Upon receiving a write command from a host computer, the head IC 156 reads information about the target track for recording from the write command, and sends the read information to the on/off switch unit 154. The on/off switch unit 154 turns on and off the laser diodes 150A' and 150B' on the basis of the information about the target track for recording.

Figure 10:
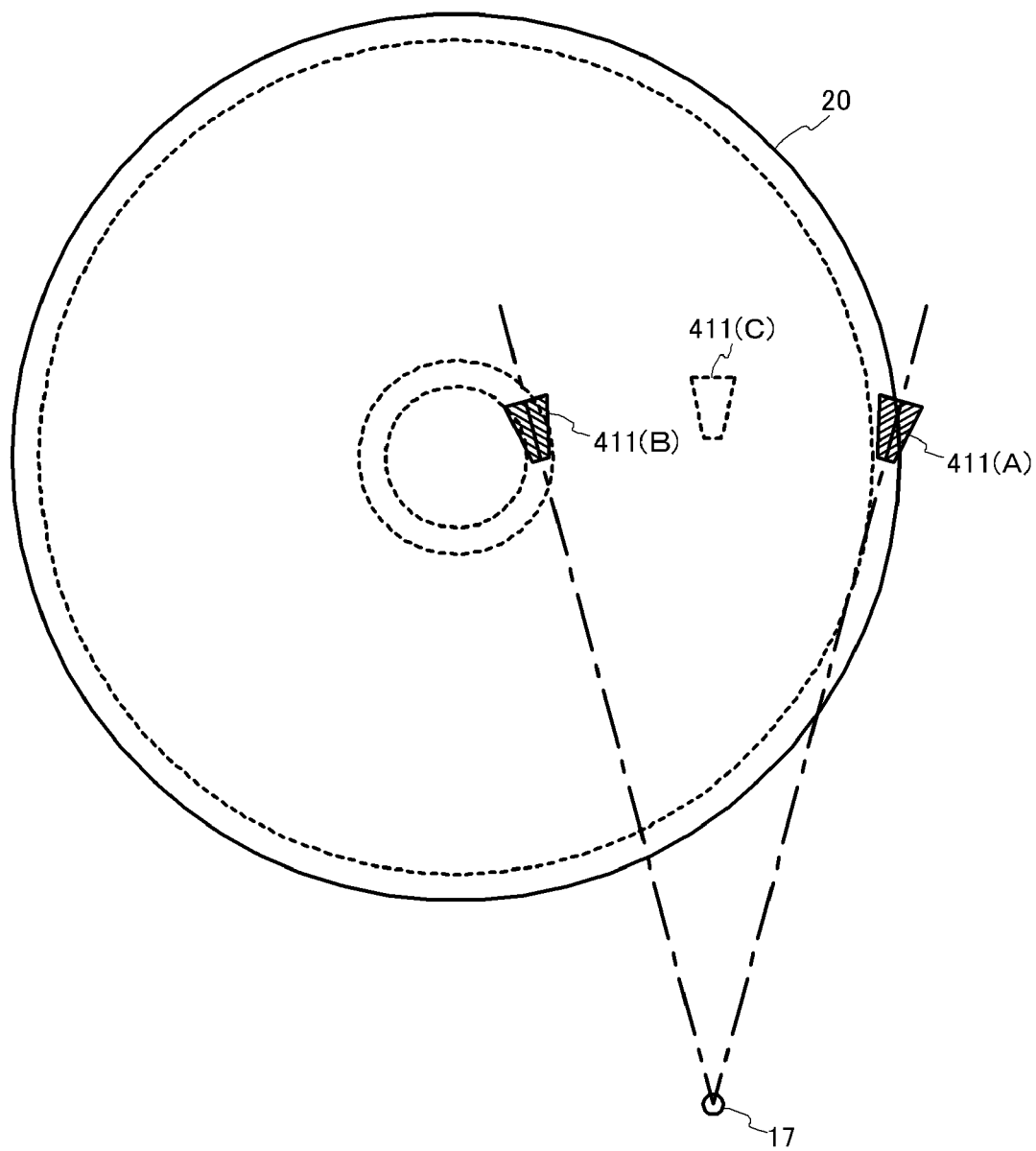
FIG. 10 illustrates a positional relation between the main magnetic pole and the magnetic disk.

FIG. 10 schematically illustrates the skew angle formed by the track and the main magnetic pole 411.

Figure 11A:
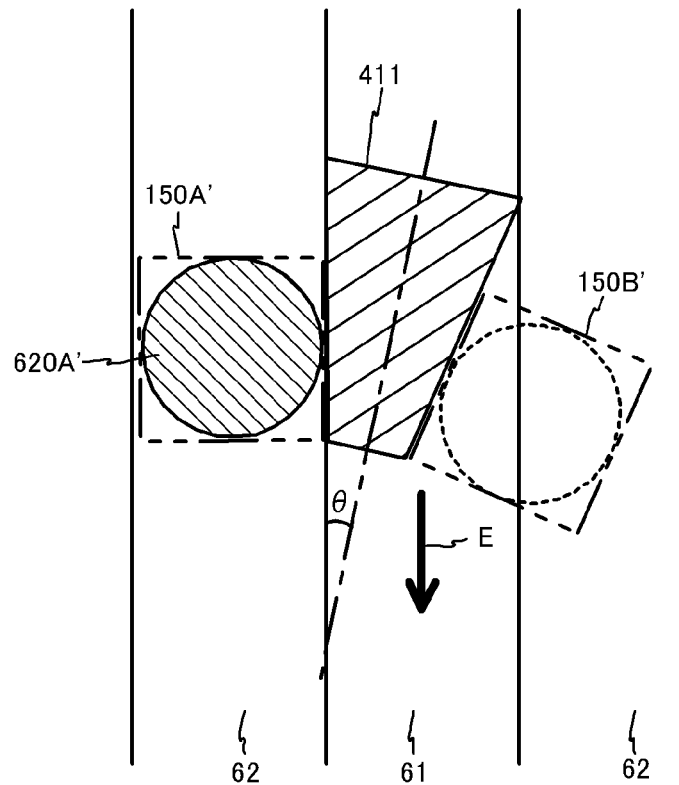
FIGS. 11A and 11B illustrate an on/off control implemented by the on/off control unit.

As depicted in FIG. 1, the head slider 34 forms the moving orbit of an arch shape. Similarly, the main magnetic pole 411 forms an arch-shaped moving orbit. Thus, as illustrated in FIG. 10, when the main magnetic pole 411 is located at a position indicated by a reference numeral of 411(A), the main magnetic pole 411 is inclined by a skew angle θ, as illustrated in FIG. 11A. Thus, the leading end of the main magnetic pole 411 (the lower end in FIG. 11A) becomes close to the track at the left side of the target track.

When the main magnetic pole 411 is located at a position indicated by a reference numeral of 411B, the leading end of the main magnetic pole 411 (the lower end in FIG. 11B) becomes close to the track at the right side of the target track.

Figure 11B:
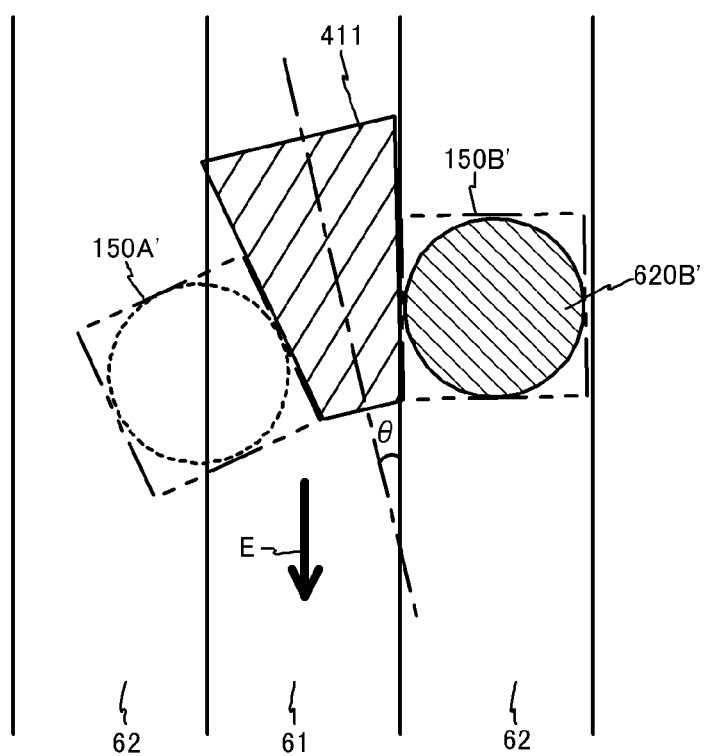

The possibility of side erasure on the left-side adjacent track is greater than that on the right-side adjacent track in FIG. 11A, and the possibility of side erasure on the right-side adjacent track is greater than that on the left-side adjacent track in FIG. 11B.

In the present embodiment, the on/off switch unit 154 determines whether the main magnetic pole 411 is located on the inner side or outer side of the magnetic disk 20 by referring to the information about the target track for recording from the head IC 156 (information about the position of the target track). When it is determined that the main magnetic pole 411 is located on the outer side of the magnetic disk 20 as indicated by the reference numeral 411(A) in FIG. 10, the on/off switch unit 154 turns on the laser diode 150A' only to form the spot light 620A'. Thus, only the left-side adjacent track (more specifically, only the soft magnetic layer 21 of this track) is heated.

In contrast, when it is determined that the main magnetic pole 411 is located on the inner side of the magnetic disk as indicated by the reference numeral 411(B) in FIG. 10, the on/off switch unit 154 turns on the laser diode 150B' only to form the spot light 620B'. Thus, only the right-side adjacent track (more specifically, only the soft magnetic layer 21 of this track) is heated.

In a case where it is determined that the main magnetic pole 411 is located at an intermediate position between the our circumference of the magnetic disk 20 and the inner circumference thereof, as indicated by a reference numeral of 411(C) in FIG. 10, the on/off switch unit 154 may turn on both the laser diodes 150A' and 150B'. In the intermediate position, the main magnetic pole 411 is located at the center of the target track for recording, and the side erasure is hard to take place. Thus, both the laser diodes 150A' and 150B' are turned off.

According to the second embodiment, the above-mentioned control is carried out on the basis of the position of the main magnetic pole 411 with respect to the magnetic disk 20. It is thus possible to obtain effects similar to those of the first embodiment and to efficiently use the laser diodes and realize power saving.

The laser spots of the laser diodes 150A' and 150B' are not limited to an almost circular shape but may be an elliptical shape or a rectangular shape as in the case of the first embodiment.

The on/off switch unit 154 used in the second embodiment turns on and off the laser diodes 150A' and 150B' on the basis of the positional relation between the main magnetic pole 411 and the magnetic disk 20. By way of another example, there is provided a unit that detects the skew angle θ and turns on and off the laser diodes 150A' and 150B' on the basis of the detection result.

Figure 12A:
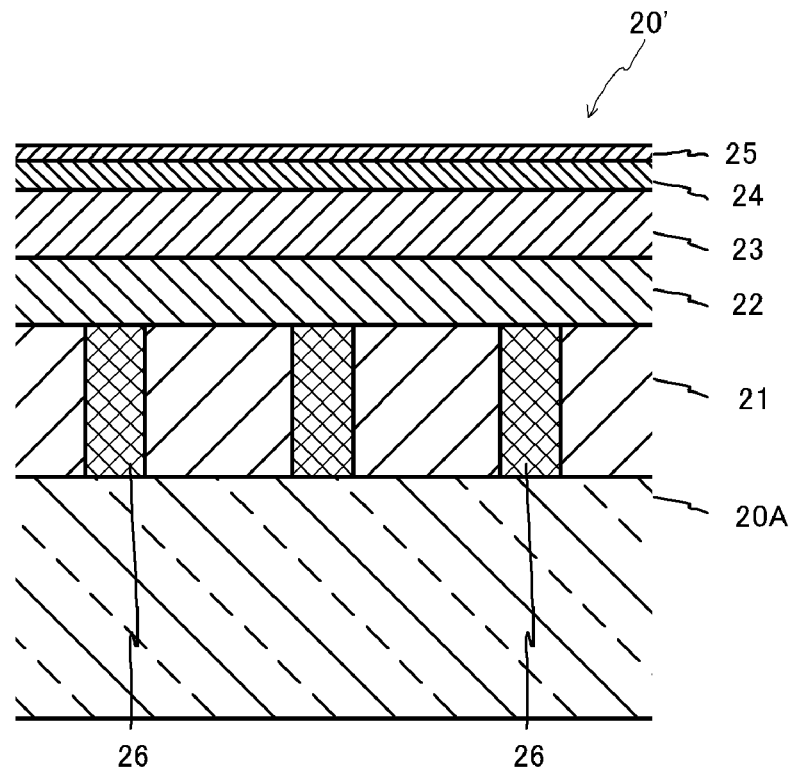
FIGS. 12A and 12B are cross-sectional views of variations of the magnetic disk.
Figure 12B:
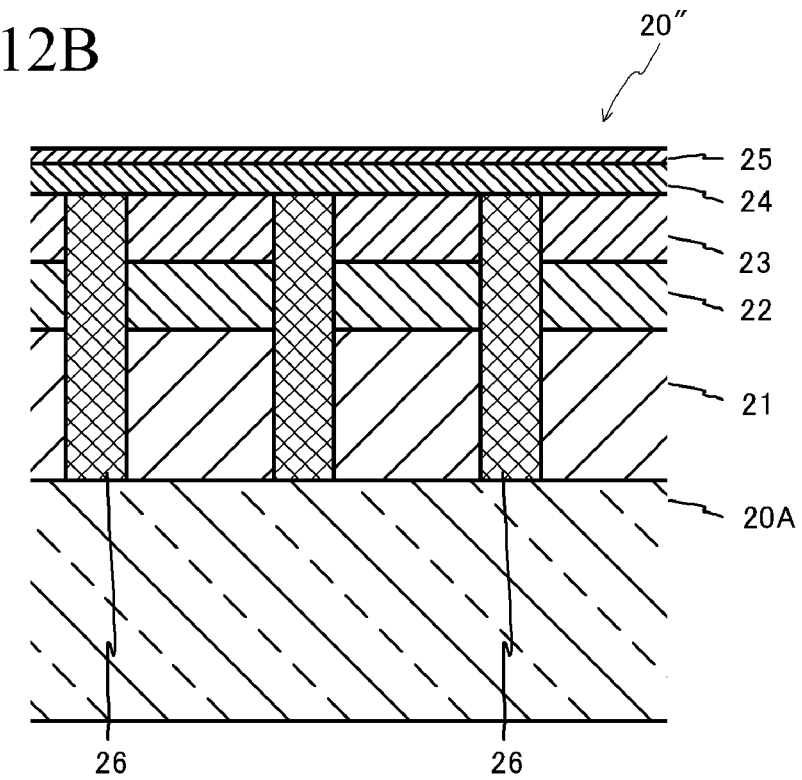
Figure 13:
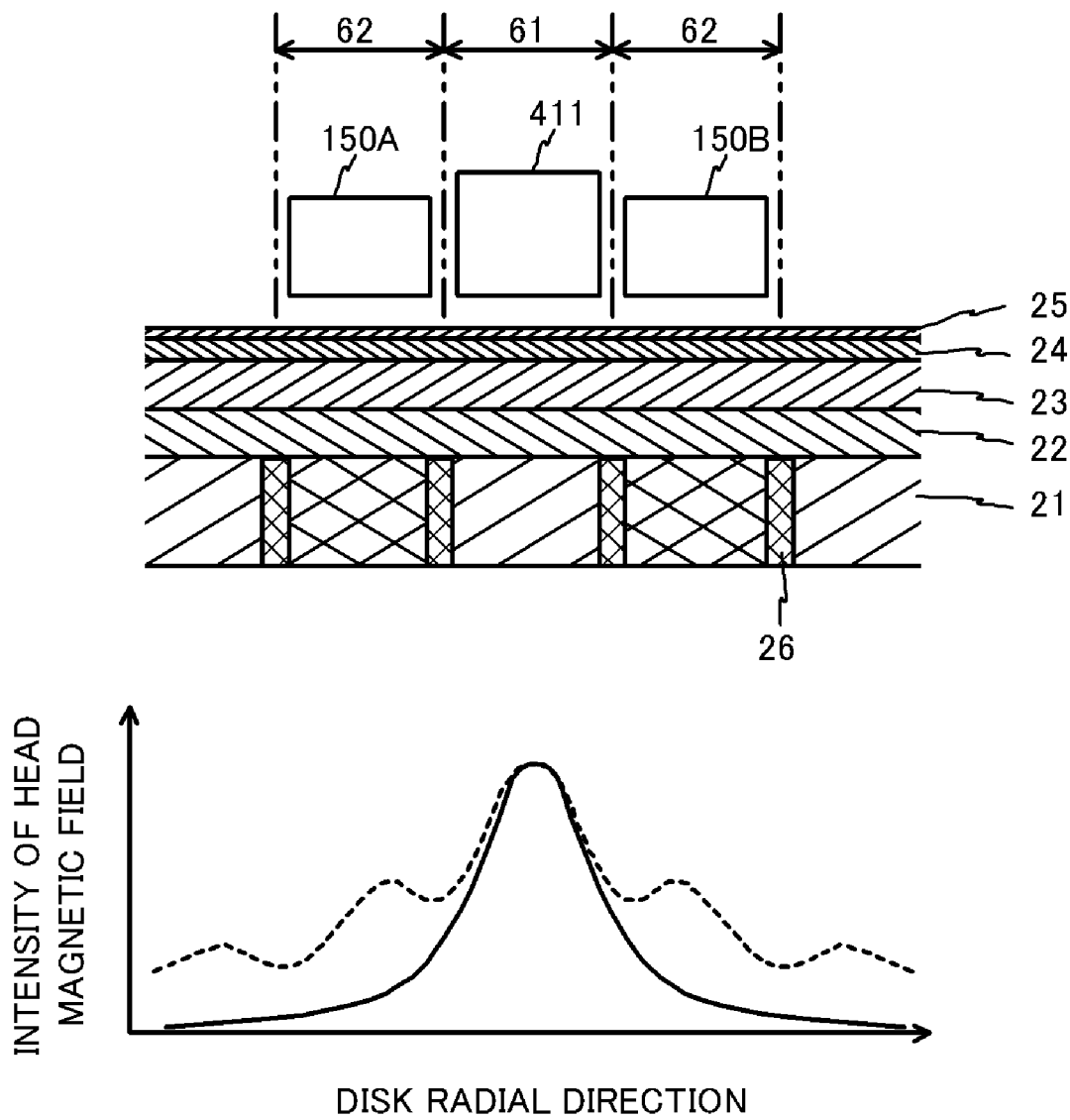
FIG. 13 illustrates effects of the magnetic disk illustrated in FIG. 12A.

The first and second embodiments may be configured to have a magnetic disk 20' illustrated in FIG. 12A or another magnetic disk 20" illustrated in FIG. 12B. In the magnetic disk 20', the soft magnetic layer 21 that has parts of a track shape having a predetermined width and a non-magnetic layer 26 having a predetermined width are alternately arranged in the radial direction of the magnetic disk. This arrangement is similar to a discrete track arrangement in which the recording layer is divided into parts. When the tracks are not heated, an intensity distribution of the head magnetic field is as illustrated by a broken line in FIG. 13. When the adjacent tracks are heated, the intensity distribution of the head magnetic field is steepened, as illustrated by a solid line in FIG. 13. It is thus possible to more effectively suppress the side erasure.

The magnetic disk 20" illustrated in FIG. 12B has the soft magnetic layer 21 that has divided parts of the track shape, the intermediate layer 22 having the same shape as the soft magnetic layers 21, the hard magnetic layer 23 having the same shape as the soft magnetic layers 21, and the non-magnetic layer 26 having divided parts. The stacked parts composed of the divided parts of the layers 21, 22 and 23 and the divided parts of the non-magnetic layer 26 are alternately arranged. This arrangement brings about advantages similar to those of the magnetic disk 20' illustrated in FIG. 12A.

In FIGS. 12A and 12B, the soft magnetic layer 21 has the divided parts of the track shape. Alternatively, the soft magnetic layer 21 may be shaped in bits as in the case of bit patterned media. The main magnetic pole 411 heats areas in proximity to the target bit, so that the linear recording density of the magnetic disk can be improved.

Figure 14:
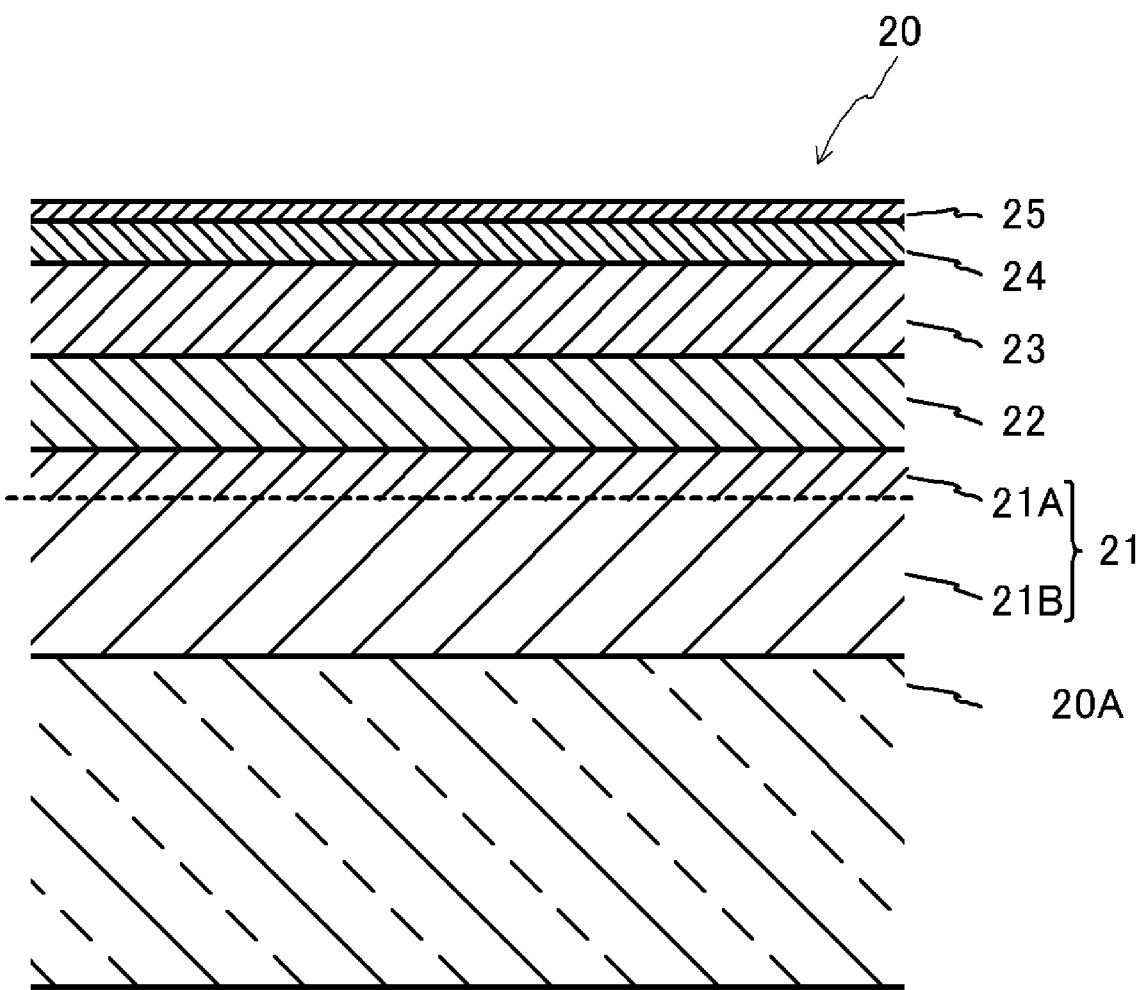
FIG. 14 is a cross-sectional view of another variation of the magnetic disk.

In the first and second embodiments, the whole soft magnetic layer 21 is formed by a material having a Curie temperature lower than that of the hard magnetic layer 23. The soft magnetic layer 21 may be configured to have two soft magnetic layers 21A and 21B, as illustrated in FIG. 14, in which only the upper layer 21A is formed of a material having a Curie temperature lower than that of the hard magnetic layer 23. When the soft magnetic layer 21 is heated, the magnetic flux is blocked by the upper layer 21A and does not reach the lower layer 21B. It is thus possible to obtain advantages similar to those of the aforementioned embodiments. The multilayered structure of the soft magnetic layer 21, which may be typically the above two-layer structure, may be applied to the magnetic disks 20' and 20" respectively depicted in FIGS. 12A and 12B.

In the above embodiments, the intermediate layer 22 is provided between the hard magnetic layer 23 and the soft magnetic layer 21. The embodiments may be varied so that the intermediate layer 22 is extremely thinned or omitted. This variation magnetically couples a part or all of the thickness of the soft magnetic layer 21 with the hard magnetic layer 23. In the target area for recording, the soft magnetic layer 21 facilitates inversion of the magnetization of the hard magnetic layer 23, so that the magnetization of the hard magnetic layer 23 can be inverted easily. It is thus possible to define the restricted area in which the magnetization can be inverted easily.

Figure 15A:
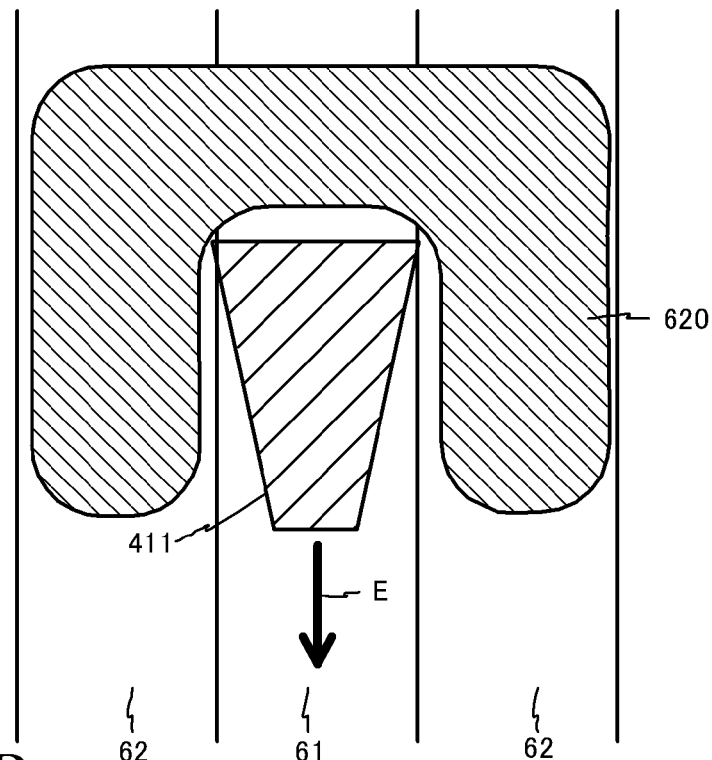
FIGS. 15A and 15B illustrate variations of the light projection head.
Figure 15B:
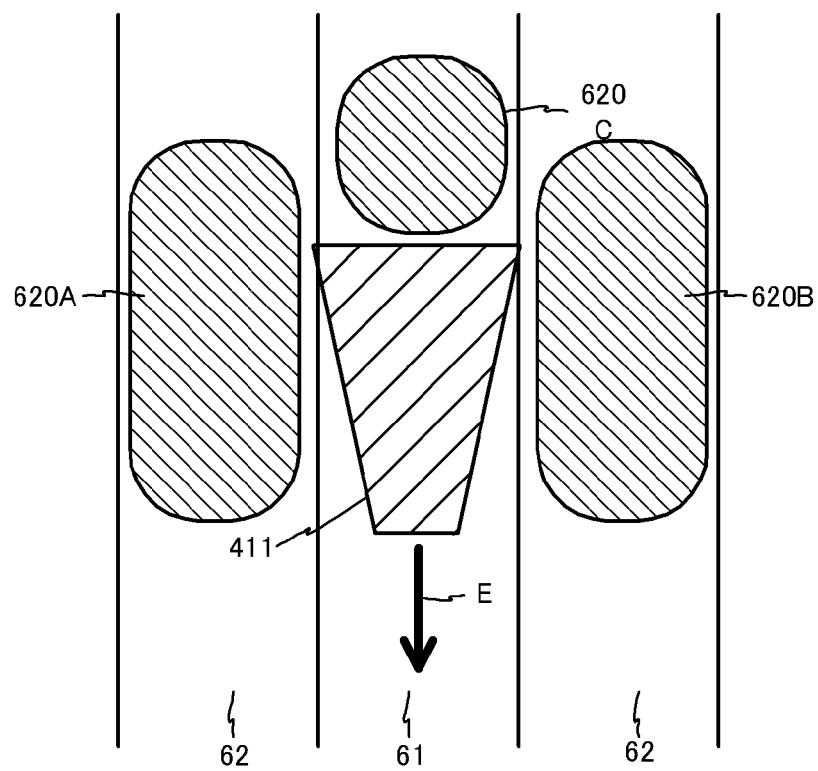

The embodiments are not limited to the use of the two laser diodes 150A and 150B (or 150A' and 150B') attached to the light projection head 50 in order to hear the tracks 62 adjacent to the target track 61 for recording. For example, as illustrated in FIG. 15A, laser light may be configured to form a U-shaped spot light 620. As illustrated in FIG. 15B, laser light may be configured to form three spot lights 620A, 620B and 620C. The spot light 620C heats an area in back of the main magnetic pole 411 on the target track for recording in the traveling direction of the main magnetic pole 411 indicated by the arrow E. It is thus possible to prevent overwriting (erasing) in areas other than the target area for recording on the target track 61.

It is also possible to heat an area in front of the main magnetic pole 411 on the target track for recording in the traveling direction of the main magnetic pole 411 indicated by the arrow E. Heating the area in front of the main magnetic pole 411 in the traveling direction is particularly effective to random recording on the magnetic disk 20.

The heating unit is not limited to the light projection head 50 but may be of another type such as a thermal source including a heating wire.

The soft magnetic layer 21 or part thereof is not limited to a material having a Curie temperature of about 150° C. but may be made of a material having a Curie temperature lower than that of the hard magnetic layer 23. For example, the Curie temperature of the soft magnetic layer 21 may be equal to or lower than about 300° C. In terms of temperature control, it is better that the difference in Curie temperature between the soft magnetic layer 21 and the hard magnetic layer 23 is greater. In this viewpoint, the Curie temperature is preferably in the range of about 100° C. to 200° C.

In the aforementioned embodiments, the soft magnetic layer 21 is heated to the Curie temperature or higher by the light projection head 50. Alternatively, the soft magnetic layer 21 may be heated to a temperature close to the Curie temperature.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. A magnetic storage apparatus comprising:
   a magnetic storage medium including a recording layer, and a backing layer including a portion having a Curie temperature lower than that of the recording layer;
   a recording head that generates a magnetic field for recording from a side of the recording layer opposite to another side on which the backing layer is provided; and
   a heater unit provided in the recording head heating at least a part of an area in proximity to a target area for recording by the recording head,
   wherein when the recording head records information on the target track, the heater unit heats only an adjacent track closer to a magnetic pole of the recording head on the target track.

2. The magnetic storage apparatus according to claim 1, wherein the backing layer comprises a multilayered structure, and the portion having the Curie temperature lower than that of the recording layer is one layer of the multilayered structure, being close to the recording layer.

3. The magnetic storage apparatus according to claim 1, wherein the portion of the backing layer has a Curie temperature equal to or lower than 200° C.

4. The magnetic storage apparatus according to claim 1, wherein the portion of the backing layer includes a Ni-base soft magnetic material that contains at least one of Al, Ti, Cr, Mo and Si.

5. The magnetic storage apparatus according to claim 1, wherein the backing layer includes a track-shaped portion or bit-shaped portion.

6. The magnetic storage apparatus according to claim 1, wherein the recording layer has the same shape as the backing layer.

* * * * *

UNITED STATES PATENT AND TRADEMARK OFFICE
CERTIFICATE OF CORRECTION

PATENT NO.         : 8,179,637 B2
APPLICATION NO.    : 12/481949
DATED              : May 15, 2012
INVENTOR(S)        : Hiroto Takeshita It is certified that error appears in the above-identified patent and that said Letters Patent is hereby corrected as shown below:

On the Patent Face:

Under "(73) Assignee", please delete "Toshiba Storage Device Corporation"

and insert -- Kabushiki Kaisha Toshiba --

Signed and Sealed this
Ninth Day of October, 2012

David J. Kappos
*Director of the United States Patent and Trademark Office*